J. N. CARTER.
PULVERIZER.
APPLICATION FILED JAN. 9, 1918.

1,301,384.

Patented Apr. 22, 1919.
2 SHEETS—SHEET 1.

Inventor
J. N. Carter,

By
*[signature]*
Attorney

J. N. CARTER.
PULVERIZER.
APPLICATION FILED JAN. 9, 1918.
1,301,384.
Patented Apr. 22, 1919.
2 SHEETS—SHEET 2.
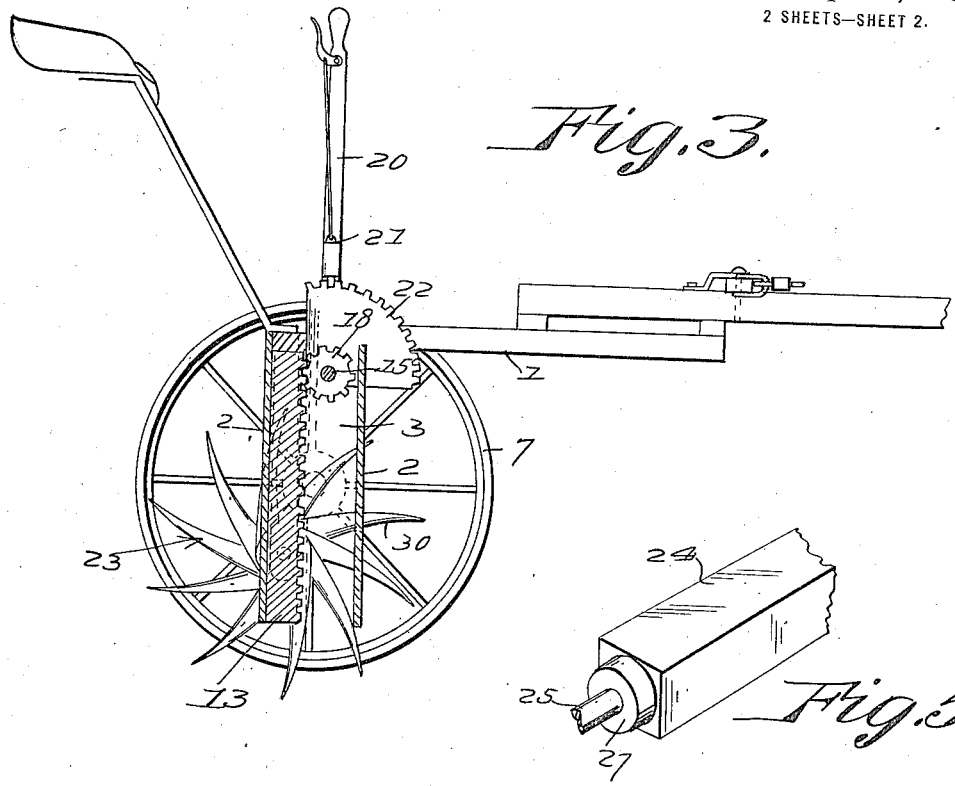
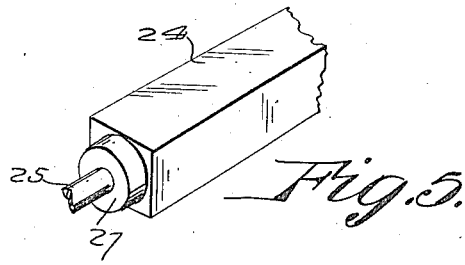
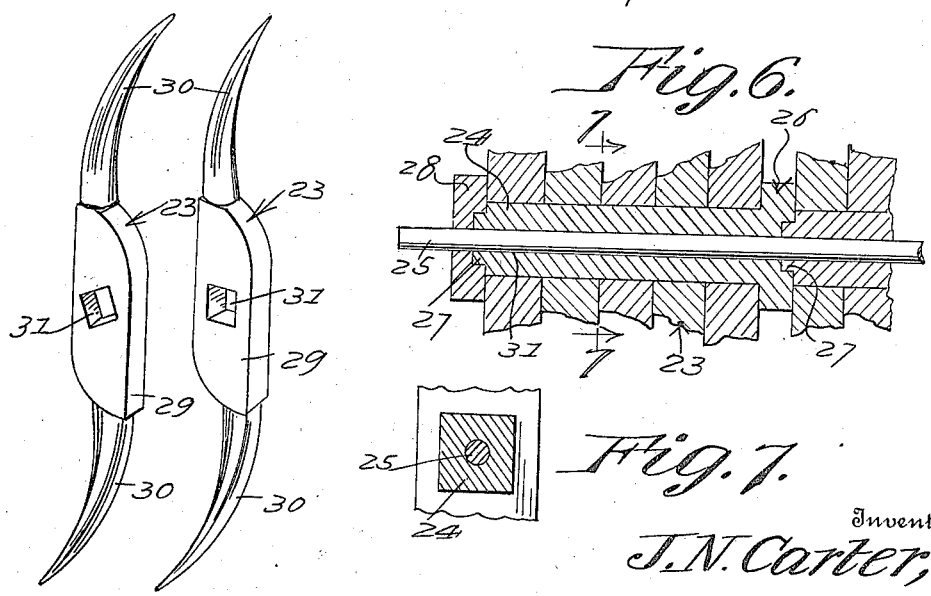
Inventor
J. N. Carter,
By
Attorney

UNITED STATES PATENT OFFICE.

JESSE N. CARTER, OF AMERICUS, GEORGIA.

PULVERIZER.

1,301,384.     Specification of Letters Patent.     Patented Apr. 22, 1919.

Application filed January 9, 1918. Serial No. 210,997.

*To all whom it may concern:*

Be it known that I, JESSE N. CARTER, a citizen of the United States, residing at Americus, in the county of Sumter and State of Georgia, have invented new and useful Improvements in Pulverizers, of which the following is a specification.

The invention relates in general to agricultural machines, but belongs particularly to that class of such machines known as pulverizers.

The principal purpose is the provision of a machine of this character by means of which the ground or earth may be thoroughly broken and pulverized without requiring excessive power for the operation of the machine.

Another purpose of the invention is the provision of a machine by means of which the earth may be broken or pulverized to variable depths as occasion may require.

Still another purpose of the invention seeks to provide a machine whereby undergrowths and roots will be destroyed when disintegrating the surface of the ground by the advancement of the machine thereover.

Still another purpose is the provision of a machine which is simple in construction, thoroughly reliable and efficient in its operation, readily and easily adjusted, strong and durable and inexpensive to manufacture.

The drawings illustrate and the specification describes a particular embodiment of the invention, but to this the invention is not to be restricted. The actual reduction to practice may suggest desirable changes or alterations, and the right is claimed to make any which do not deviate from the scope of the annexed claims.

Figure 1:
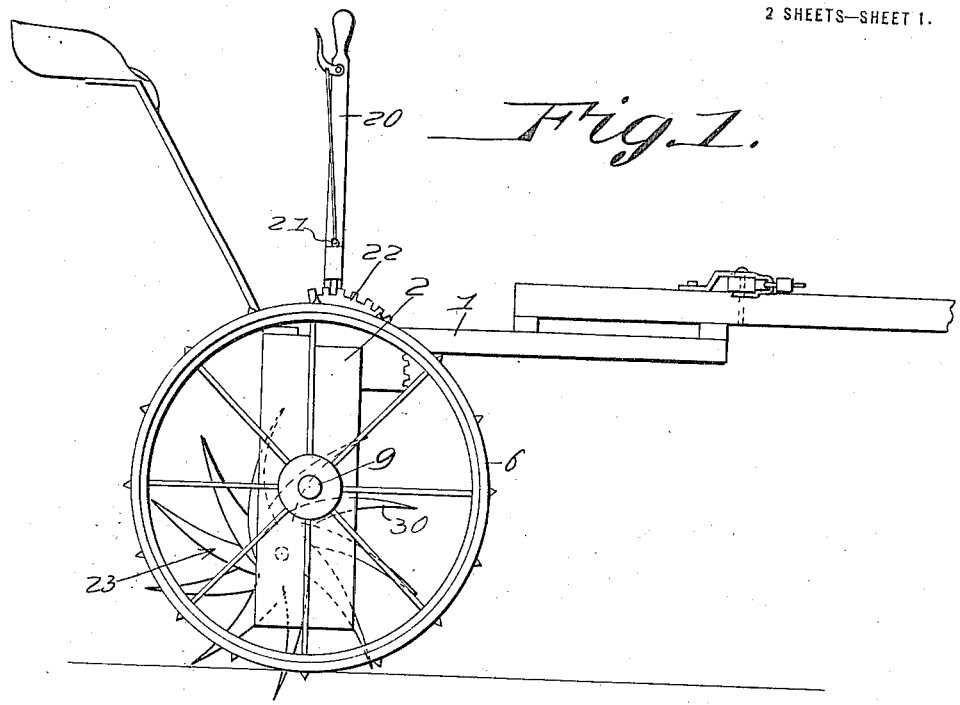
Figure 2:
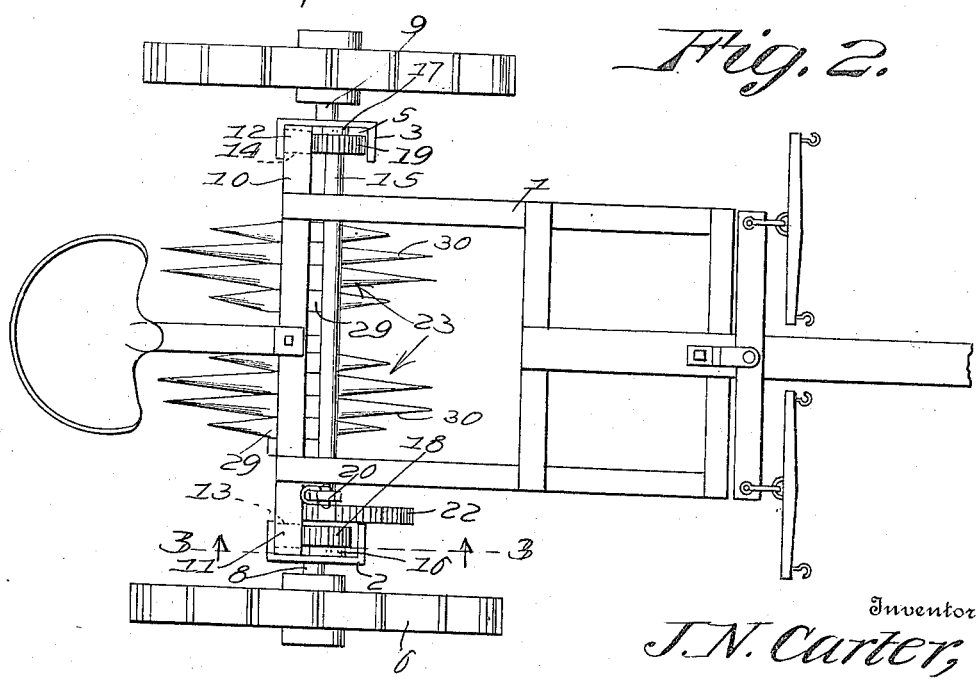

The same numerals designate the same parts throughout the several figures of the drawings wherein:

Figure 1 is a fragmentary side elevation of a machine constructed in accordance with the invention, Fig. 2 is a top plan view of the structure shown in Fig. 1, Fig. 3 is a section on the line 3—3 of Fig. 2, Fig. 4 is a collective perspective view of a pair of the pulverizing tines, Fig. 5 is a detail perspective view of the sleeve designed for carrying the tines, Fig. 6 is a longitudinal sectional view showing the tine carrying sleeves and the body portions of the tines, Fig. 7 is a section on the line 7—7 of Fig. 6.

Referring to the drawings in detail, there is shown a machine frame 1 mounted for vertical movement on the uprights 2 and 3 respectively, these uprights being formed with guide channels 4 and 5. To the uprights there are attached, the stud axles 8 and 9 on which are journaled the traction wheels 6 and 7.

The frame 1 has mounted thereon, a cross bar 10, the ends 11 and 12 of which are secured to vertical rack bars 13 and 14 which are slidably fitted in the channels 4 and 5 formed in the uprights 2 and 3 respectively, the latter being preferably made from metal. Supported between the uprights 2 and 3 and carried near the upper ends of the latter there is a shaft 15 which has its ends journaled in appropriate bearings 16 and 17 fixed in the channels of the said uprights. This shaft 15, at either end and adjacent the bearings carries the pinions 18 and 19, these two pinions meshing with the teeth of the rack bars 13 and 14 respectively, so that the rotation of the shaft 15 in either direction may serve to raise or lower the frame 1 relative to the uprights, in order that the pulverizing mechanism may be adjusted relative to the ground to permit the operation of said mechanism to penetrate the ground for the desired depth. The shaft 15 has fixedly attached to it, a throw lever 20, which carries a manually released spring held latch 21, the latter being designed for locking engagement with a toothed sector 22, which is fixed to the upright 2 by any acceptable method of attachment. The sector 22 together with the latch 21 and throw lever 20 serve as an adjusting means for the frame, the engagement of the latch with the sector operating to lock the frame in its various adjusted positions.

The pulverizing mechanism comprises two gangs of tines 23, sleeves 24 on which the tines are mounted, and a shaft 25 whose ends are journaled in appropriate bearings formed in the rack bars 13 and 14, the bearings for the shaft 25 being arranged close to the lower ends of the rack bars. The sleeves 24 are loosely supported on the shaft 25, so that they may have angular movement relative to the shaft. The sleeves 24 are square in cross section, but at one end terminate in integral collars 26, which are of greater diameter than the square portions of the sleeves between diagonally opposite corners. At the ends remote from the collars 26, the sleeves 24 have reduced circular portions 27 whose diameter is slightly less than the cross sectional dimensions of the square portions of the sleeves. The two sleeves are interlocked, the one having a circular portion 27 engaging in a corresponding counter-bore formed in the collar 26 of the other, the collar 26 being counter-bored concentric with the bore of the sleeves. That sleeve 24 whose circular portion 27 is adjacent the bearing for the shaft 25 is provided with a spacing collar 28 which is identical both in shape and dimension with its integral collar 26, this collar 28 being provided as a spacing means between the end of the sleeve and the adjacent bearing.

It will be observed that while the sleeves inter-connect, the one may move angularly with respect to the other, this provision being made for a purpose later described.

Each of the sleeves is designed to carry the pulverizing tines 23, each of which comprises a body portion 29 with digging arms 30 formed at either end. The body portion 29 of the tines is flat, but the digging arms are made circular in cross section, and taper from their point of juncture with the body to their extreme ends, the points being made relatively sharp so that they may easily penetrate the ground. The digging arms further than being made circular in cross section are made arcuate in shape and the two arms of any one tine are oppositely disposed with reference to the arcs on which they are formed.

Each tine has formed transversely through its body portion 29 and centrally disposed in the body portion, a square eye 31 formed to the proper dimensions to permit the tines to be mounted on the square portion of the sleeve member 24. Each sleeve member is of such a length that it will support a plurality of the tines 23 and all of the tines supported on any one sleeve constitute an individual gang, each one of which has its eye so arranged in the body portion that it will give the tine an angular advance over an adjacent tine in the same gang. Thus each gang of tines are so positioned on their attendant sleeve that their attendant arms 30 are spaced at uniformly shaped angular intervals therearound.

In the operation of the machine, the shaft 25 is designed to turn its bearings in the rack bars 13 and 14, thus making unnecessary any movement of the sleeve members 24 relative to the shaft. When the machine is moving in a straight line across the ground, the arms 30 of each successive tine of each gang will be brought into contact with the ground, the digging into the ground of each tine serving to rotate the whole system. As long as each gang of tines moves uniformly, there will be no relative movement between their sleeve members 24 and the shaft 25, thus the whole system will rotate and the shaft 25 will turn on its journals in the bearings in the rack bars. In the event, however, that some one tine is subjected to a retarding pressure, such as would occur if its digging arm encountered a root, its sleeve member 24 would be momentarily retarded, but this would not affect the other tines, since the sleeve member on which the retarding tine is carried may have, but does not always have, angular movement relative to the shaft 25.

When turning curves, the particular arrangement of having the tines mounted in separate and independent gangs provides for the gang of tines moving in the larger arc of the curve rotating at a greater speed than those at the shorter arc of the curve.

In the drawings, there has been illustrated, but two sets of gangs of tines. It is obvious, however, that the number of gangs may be increased to any amount within practical limits without departing from the spirit of the invention.

The means previously described for elevating and lowering the frame 1 provides for adjusting the tines to dig to any desired depth, thus accomplishing one of the principal objects for which the invention is designed.

The invention having been described, what is claimed as new and useful is:

1. A pulverizer of the kind set forth comprising a frame, a shaft mounted for rotary movement in said frame, sleeves carried by the shaft in such a way as to permit their angular movement relative to the shaft, the sleeves being polygonal in cross-section, and a gang of tines carried by each sleeve, all the tines being formed with eyes conforming in shape to the cross-sectional shape of the sleeves with the eyes of each different in relative position from the eyes of the other tines, so that a whole gang may be carried on a sleeve in such a manner that the free ends define a spiral.

2. In a machine of the kind set forth, a frame, a shaft mounted for rotary movement in said frame, sleeves carried by the shaft for rotary movement thereon, the sleeves being polygonal in cross-section and formed at one end with integral collars extending laterally beyond the body of the sleeves to form shoulders, the collars being counterbored on the side, the bodies of the sleeves being formed with reduced circular portions entering the counterbores, and a gang of tines carried by each sleeve, all the tines being formed with eyes conforming in shape to the cross-sectional shape of the sleeves with the eyes of each different in relative position from the eyes of the other tines, so that a whole gang may be carried on a sleeve in such a manner that the free ends define a spiral.

3. The herein described machine having a shaft, a plurality of sleeves supported by the shaft for angular movement thereon, and a gang of tines carried by each sleeve, the tines having outwardly projecting arms with free curved ends, the tines of each gang being fixedly positioned with respect to each other and to their respective sleeves and having their free ends uniformly spaced apart, adjacent sleeves interconnecting end for end and being capable of angular movement relative to each other, whereby the angular movement of each gang of tines may change relative to the other gangs to permit each gang to effectively perform its work when the machine is making a turn.

In testimony whereof I, JESSE N. CARTER, affix my signature.

JESSE N. CARTER.